UNITED STATES PATENT OFFICE.

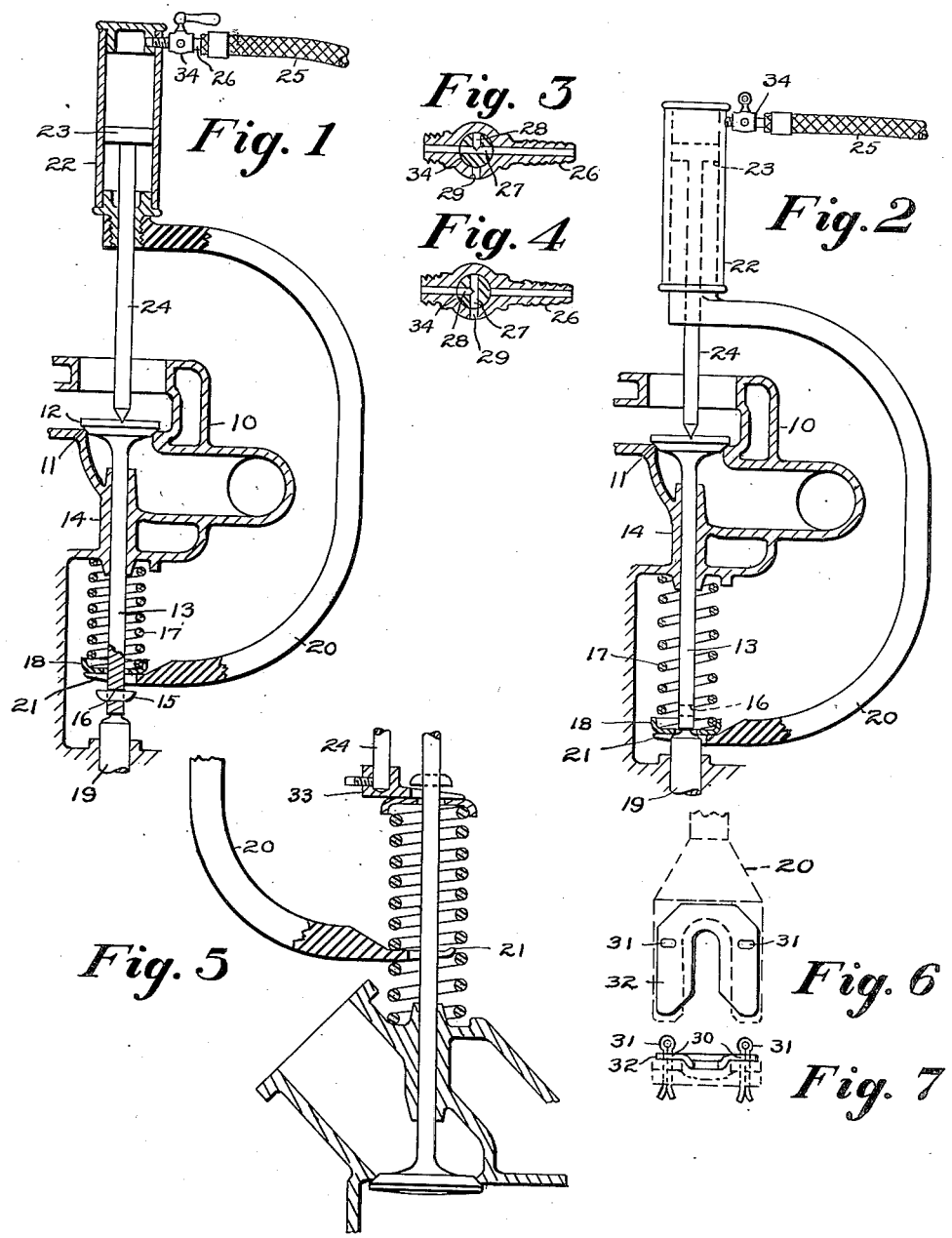

WALTER A. BARR, OF FORT WAYNE, INDIANA, ASSIGNOR TO THE POLHAMUS COMPANY, OF FORT WAYNE, INDIANA, A CORPORATION.

TOOL FOR COMPRESSING VALVE-SPRINGS.

1,324,099.   Specification of Letters Patent.   Patented Dec. 9, 1919.

Application filed February 2, 1918. Serial No. 215,173.

*To all whom it may concern:*

Be it known that I, WALTER A. BARR, a citizen of the United States, residing at Fort Wayne, in the county of Allen and State of Indiana, have invented new and useful Improvements in Tools for Compressing Valve-Springs, of which the following is a specification.

The invention relates to devices for compressing the springs of valves generally and particularly the springs of valves in internal combustion engines preparatory to the removal of the valves.

In removing a valve from many forms of engines it is required to compress the spring opposing the valve in order that the device— usually a pin in the valve stem—which supports the spring at one end may be removed to permit of the withdrawal of the valve.

The object of my invention is to provide a simple and cheap device by which a valve spring may be very rapidly and easily compressed so that the valve may be very quickly removed and thereby save much time and labor.

The invention consists in a tool having a member for engaging the spring and another member for engaging the head of the valve and means to produce relative movement of the two members.

In the drawings I illustrate an embodiment of the invention in which Figure 1 is a section of a portion of an engine with the invention applied to the valve and spring, the spring being compressed. Fig. 2 is a similar view, the spring supporting pin in the valve stem having been removed and the plunger of the tool having been vented. Fig. 3 is a cross-sectional view of the controlling valve of the device, in the position shown in Fig. 1, Fig. 4 a cross-sectional view of the same in the venting position. Fig. 5 is a sectional view of the tool adapted for and in use upon a valve inverted relatively to that shown in Figs. 1 and 2, and Fig. 6 is a plan view of a modified form of fork for the end of the yoke of the tool and Fig. 7 an end view of the same.

Referring to the drawings, 10 represents a section of an internal combustion engine and 11 the valve seat for the valve 12, the stem 13 of which is longitudinally slidable in bearing 14. A pin 15 is engaged in a slot 16 in the stem 13 and between the pin and the bottom of bearing 14 is a coiled spring 17, which tends to hold the valve on its seat. The lower end of the spring is retained in a cup 18 which is loose on stem 13 and normally bears on pin 15. The valve is actuated by plunger 19 in the usual manner. To remove the valve it is first necessary to compress spring 17 to permit pin 15 to be withdrawn from stem 13, since the pressure exerted by the spring on the retainer and the pin is too great to permit of the removal of the spring unless that pressure is released. I compress the spring by the tool illustrated in which the forked extremity 21 of a yoke 20 is adapted to be engaged about stem 13 beneath retaining cup 18. The other end of the yoke is connected to cylinder 22 in which cylinder is plunger 23 connected to rod 24, which rod is adapted to be engaged on the upper side of valve 12. A two-way valve 34 is connected to cylinder 22 above plunger 23 and a hose or other conduit 25 for supplying air under pressure to the cylinder is connected to nipple 26 on the valve body. Valve 34 has a passageway 27 adapted to afford communication between the conduit and cylinder and a passageway 28 adapted to connect the cylinder and port 29 in the valve body for venting the cylinder.

In operation, with the tool installed on the valve as above described, and with valve 34 closed to conduit 25 (Figs. 2 and 4) the user rotates the valve a quarter turn to connect the supply of air under pressure to the cylinder. Valve 12 is rigid on its seat, hence plunger 23 can not descend in the cylinder under the influence of the air under pressure but cylinder 22 and the yoke rise thereby compressing spring 17 as shown in Fig. 1. This movement of the yoke releases pin 15 which is now removed from valve stem 13 and valve 22 is returned to its normal position of non-use (Fig. 2) and the cylinder and yoke drop down and the tool is removed. Valve 12 is then easily withdrawn through its seat.

An aperture 30 is formed in each bifurcation of the lower end of yoke 20 to receive a cotter pin 31 for attaching to the yoke forks of various widths to fit various diameters of valve stems 13, fork 32 being one such attachable member.

Where, as in some types of engines the valves are inverted (Fig. 5) relatively to the valve above described, I provide a fork 33 adapted to be secured to the lower end of plunger rod 24 and which is intended to be engaged about the valve stem and bearing on the spring retainer. The bifurcated end of yoke 20 is inserted between two coils of the spring and the air under pressure turned into the cylinder as before. The spring is compressed between the two forks and the stem pin is released as before.

It is apparent that by the use of the invention a valve may be easily removed and with great rapidity.

What I claim is:

A tool for compressing valve springs consisting of a cylinder, a forked member secured to and depending from the cylinder and adapted to engage the spring, a plunger in the cylinder, a rod depending from the plunger and adapted to engage the valve, and a hose connection in the cylinder adapted to admit air under pressure above the plunger for producing relative movement between the rod and the forked member.

In witness whereof I hereunto subscribe my name this 26th day of January, 1918.

WALTER A. BARR.